United States Patent
Våhlström (10) Patent No.: US 9,835,030 B2
(45) Date of Patent: Dec. 5, 2017

(54) ROCK BOLT

(71) Applicant: Ola Våhlström, Malmberget (SE)

(72) Inventor: Ola Våhlström, Malmberget (SE)

(*) Notice: Subject to any disclaimer, the term of this patent is extended or adjusted under 35 U.S.C. 154(b) by 88 days.

(21) Appl. No.: 14/762,119

(22) PCT Filed: Feb. 6, 2014

(86) PCT No.: PCT/SE2014/000015
§ 371 (c)(1),
(2) Date: Jul. 20, 2015

(87) PCT Pub. No.: WO2014/123467
PCT Pub. Date: Aug. 14, 2014

(65) Prior Publication Data
US 2015/0354354 A1    Dec. 10, 2015

(30) Foreign Application Priority Data
Feb. 7, 2013   (SE) ........................... 1300102

(51) Int. Cl.
*E21D 21/00* (2006.01)
*E21D 20/02* (2006.01)
(Continued)

(52) U.S. Cl.
CPC ............. *E21D 21/008* (2013.01); *E02D 5/80* (2013.01); *E21D 20/00* (2013.01);
(Continued)

(58) Field of Classification Search
CPC ................ E21D 21/00; E21D 21/0026; E21D 2021/0073; E21D 21/008; E21D 20/02;
(Continued)

(56) References Cited

U.S. PATENT DOCUMENTS 2,362,556 A * 11/1944 Hubbard ................. E02D 5/805
52/160
2,525,198 A * 10/1950 Beijl ..................... E21D 21/008
405/259.3

(Continued)

FOREIGN PATENT DOCUMENTS

WO    WO04001192    12/2003
WO    WO2006034208   3/2006

*Primary Examiner* — Benjamin Fiorello
*Assistant Examiner* — Edwin Toledo-Duran (57) ABSTRACT

Rock bolt (1) comprising at least an elongated body (4), one end of which comprises at least a first external conical portion (16) extending through at least one hole (12) in at least a cylindrical expandable body (5), the hole (12) over a section of the bore hole in the axial direction comprises an internally conical part (15) intended to cooperate with the elongate member outer conical portion (16). Upon relative movement of the elongate body (4) and the expandable body (5) in one direction expands the expandable body in the radial direction. The relative axial movement between the elongated body (4) and the expandable body (5) is provided by at least one tensioning device (7). The rock bolt comprises at least one wedge device (2), which in use of the rock bolt, is connected to the expandable body (5) hole (12) and at least partially inserted between a first portion (17) and at least a second part (18). The rock bolt further comprises at least one connecting means (21).

10 Claims, 5 Drawing Sheets

(51) Int. Cl.
- *E21D 20/00* (2006.01)
- *E21D 21/02* (2006.01)
- *E02D 5/80* (2006.01)
- *F16B 13/04* (2006.01)

(52) U.S. Cl.
CPC ......... *E21D 21/0093* (2013.01); *E21D 21/02* (2013.01); *F16B 13/045* (2013.01)

(58) Field of Classification Search
CPC ..... E21D 20/023; E21D 20/026; E02D 29/02; E02D 29/0225; E02D 29/0233; E02D 29/0241
USPC .............. 405/259.1–259.6, 262; 52/155–165
See application file for complete search history.

(56) References Cited

U.S. PATENT DOCUMENTS

| | | | | |
|---|---|---|---|---|
| 2,725,843 A * | 12/1955 | Koski | ................. | E21D 21/0093 116/212 |
| 3,179,082 A | 4/1965 | Mcclean | | |
| 3,226,934 A * | 1/1966 | Emery | ................. | E21D 21/006 405/259.3 |
| 4,011,787 A * | 3/1977 | White | ................. | E21D 21/008 405/259.3 |
| 4,160,615 A * | 7/1979 | Baldwin | ............. | E21D 21/0026 405/259.3 |
| 4,195,952 A * | 4/1980 | Swanson | ................. | E21D 20/00 405/259.3 |
| 4,265,571 A * | 5/1981 | Scott | ..................... | E21D 11/006 405/259.3 |
| 4,278,006 A * | 7/1981 | Lobello | ................. | F16B 13/066 405/259.3 |
| 4,305,687 A * | 12/1981 | Parker | ................... | E21D 20/021 405/259.3 |
| 4,362,440 A * | 12/1982 | Glaesmann | ........... | E21B 33/128 405/259.5 |
| 4,369,003 A * | 1/1983 | Brandstetter | ........... | E21D 20/02 405/259.3 |
| 4,380,407 A * | 4/1983 | Donan, Jr. | ............ | E21D 21/008 405/259.3 |
| 4,474,516 A * | 10/1984 | Schiefer | ................ | F16B 13/065 411/44 |
| 4,475,329 A * | 10/1984 | Fischer | ............... | F16B 13/0858 405/259.1 |
| RE31,776 E * | 12/1984 | Clark | .................... | E21D 20/025 405/259.6 |
| 4,516,883 A * | 5/1985 | Zeitler | .................... | E21D 20/02 405/259.3 |
| 4,611,954 A * | 9/1986 | Cassidy | ................ | E21D 21/008 405/259.1 |
| 4,704,053 A * | 11/1987 | Hipkins, Sr. | ............ | E21D 20/02 405/259.1 |
| 4,784,530 A * | 11/1988 | Price, Jr. | ................ | E21D 21/008 405/259.3 |
| 4,848,971 A * | 7/1989 | Price Jr. | ................. | E21D 21/008 405/259.3 |
| 5,028,188 A * | 7/1991 | Prince | ................... | F16B 13/066 405/259.5 |
| 5,033,909 A * | 7/1991 | McCartney | ......... | E21D 21/0093 405/259.2 |
| 5,052,861 A * | 10/1991 | Hipkins, Sr. | .......... | E21D 21/008 405/259.3 |
| 5,082,399 A * | 1/1992 | Frease | ................. | E21D 21/0093 405/259.5 |
| 5,185,595 A * | 2/1993 | Friesen | ................... | E21D 21/02 340/540 |
| 5,688,066 A * | 11/1997 | Loose | .................... | F16B 13/12 403/297 |
| 6,033,153 A * | 3/2000 | Fergusson | ............... | E21D 20/02 405/259.1 |
| 6,273,655 B1* | 8/2001 | McAlpine | ........... | F16B 13/0841 411/34 |
| 6,579,049 B2* | 6/2003 | Kaibach | ................ | F16B 13/066 411/60.2 |
| 6,599,059 B2* | 7/2003 | Calandra, Jr. | ......... | E21D 21/008 405/259.4 |
| 7,927,042 B2* | 4/2011 | Spearing | ............... | E21D 11/006 405/259.1 |
| 2005/0123361 A1* | 6/2005 | Robertson | ............ | E21D 21/008 405/259.4 |
| 2006/0067795 A1* | 3/2006 | Spearing | ............... | E21D 11/006 405/259.4 |
| 2007/0031196 A1* | 2/2007 | Bruneau | ............. | E21D 21/0026 405/259.4 |
| 2007/0269274 A1* | 11/2007 | Seedsman | ........... | E21D 21/0033 405/259.1 |
| 2009/0133933 A1* | 5/2009 | Karpellus | ........... | E21D 21/0053 175/57 |

\* cited by examiner

ROCK BOLT

TECHNICAL FIELD

The present invention relates to a rock bolt in accordance with the claims.

TECHNICAL BACKGROUND

A problem in the mining and the construction of tunnels and other underground facilities in rock consists of that the roofs, walls and the like need to be strengthened so that they are prevented from collapsing down or recorded. In order to prevent parts of the mountain caves in through times several different types of devices and procedures to enhance the mountain has been developed.

A more modern example of these devices is different types of force-absorbing rock bolts and the like. A rock bolt preferably consists of an elongated body which is inserted in a hole drilled in the rock. After the elongated bolt is introduced into the hole in the rock is expanded in relation to the holes walls. Through this kind of construction collapse from the ceiling, walls and the like can be prevented.

Although existing rock bolts reduces the risk of collapse and the like, there are problems with existing types of rock bolts. One problem is posed by the existing bolts are usually time consuming to connect to the mountain. For example, existing rock bolts and the like require these to be anchored (the gate, to be fitted) with any type of encapsulation such as cement, polymeric materials, or the like. These procedures have the disadvantage that they take time to prepare, apply and solidify and/or a health hazard for construction workers to use. Some types of potting can also cause other types of adverse environmental impacts. A further problem with the use of rock bolts is present at mining. In mining operations the rock moves dynamic. The dynamic movements of the rock are increasing with the depth.

Using existing rock bolts, which connect with the castings, and similar to the rock, causes problems when these only to a limited extent the dynamic movements in the rock. There is thus a need for rock bolts were construction allows dynamic changes in the rock. In mining operations, there is need for the installation of, composition of, rock bolts shall be made with such a rational procedure and rock bolts as possible. It is therefore desirable that the roof bolts to be fitted by machine. This requires that the rock bolt has a construction which is suitable for this purpose. Most of the previously known constructions of rock bolts have the disadvantage that they cannot be installed efficiently by machine. There is thus a need for structures which can be effectively installed with machines.

There are also problems with existing types of rock bolts comprise a plurality of parts, which means that these can be complicated to manufacture and thus also expensive to manufacture and thus also buy. The known rock bolts can also cause that several different types of equipment is needed for the installation.

At the reinforcement of rock with a rock bolt of the type intended to be molded is generally used a so-called cam rock bolt, that is, a rod of solid steel, like steel reinforcements for concrete in each portion is provided with engagement means or anchor in the form of in radial direction extending cams (ribs/fins) extending in the short transverse direction. The rock bolt is inserted into one of the rock material absorption wells. Said bore has pre-filled with potting compound so that cam rock bolt enclosed with encapsulation in the borehole. At the borehole mouth cam rock bolt is equipped with end fittings, usually in the form of a nut and washer, which is applied to the area of the rock material surrounding the mouth of the drilled hole and with which the end fitting rock bolt can be given a certain degree of tension.

One known type of bolt consists of the so called "Kiruna bolt" whose distinguishing features is that it is a combination of a cam rock bolt and one in the rock mechanically fastened bolt. The rock bolt is intended to be infused in a borehole and in radial direction have extending cams which act as anchors in the molding composition. The "Kiruna bolt" further comprises end fastening device in its front end of the bolt for mechanical anchoring of the rock bolt in the bottom of the borehole. By cam rock bolt to some extent biased and to some extent carry load before the grout.

The patent SE5356927 of LKAB applicants disclosed a variant of a rock bolt which is intended to be molded into a borehole. The construction comprises in its front end section of a mechanical effective anchoring device comprising a wedge and is arranged so that the rock bolts attachment to a certain extent to be held by the expanded anchor rod. The structure further includes an elongated middle portion which includes a barrier which defines a predetermined area of the intermediate portion engaging means from contact with the molding composition in the borehole. The construction has several flaws and has the disadvantage that it takes time to install.

The patent EP0064362 of the applicant Neste O Y described a variant of a rock bolt which in its front end section comprises a wedge construction. The design differs materially from the present invention's construction.

The patent WO2006034208 describes a variant of a rock bolt comprising at least an elongated body such as a rod. The structure further includes at least one expandable body for anchoring rock bolt in a hole drilled in the rock. The structure further includes at least a clamping device which is used partly to expand the body and also used to bias the rock bolt against the rock. The rock bolt comprises at least a first taper, and at least a first wedge device. The construction in accordance with Patent them to a significant extent from the construction in accordance with the present application. For example, lacks the structure in accordance with the patent, an expandable wedge device with which the bolt is initially connected to the bore and then a second expandable wedge device is then caused to expand in the bore when the rock bolt is biased against the rock. The construction according to WO2006034208 is further difficult to install the machine which means that this probability is mounted manually. This should be seen in contrast to the construction in accordance with the present application which is preferably designed to be mounted (set) by machine. The design also has the disadvantage of this includes threads which are sensitive to dirt or the like. The construction is also less cost efficient in accordance with the construction according to the present patent application.

The construction in accordance with Patent WO2006034208 the same security as with the construction according to the present invention is not achieved. This is caused by the structure comprises solely a function to expand the expandable body.

The patent WO2004001192 describes a variant of a system comprising at least a rock bolt. The construction in accordance with the patent differs to a significant extent from the construction in accordance with the present application. For example, the structure in agreement with the patent WO2004001192 hardly is mechanized. The design requires probably encapsulation is used to secure the bolt to the mountain.

The patent US2007031196 describes a variant of a rock bolt. The rock bolt comprising an elongate body which in one embodiment, a use at least a first taper, and at least a second taper which expand at least one expandable body. The construction in accordance with the patent differs to a significant extent from the construction in accordance with the present application. The expandable body includes, for example, an expandable body of elastic material such as a plastics material, so that the structure of substantially smaller extent can absorb forces than rock bolt in accordance with the present application. The structure further includes screw expanders which are considerably more sensitive to drill ester in the hole than the construction in accordance with the present patent application is.

The patent U.S. Pat. No. 5,185,595 describes a variant of a device for measuring the tension of a rock bolt. The design includes disc springs, but otherwise different design under patent to a significant extent from the structure in accordance with the present application. For example describes nothing about rock bolt other design in the patent. The design has been further major drawbacks of the rock bolt is not connected in parallel to the walls of the borehole. Further, construct a measuring device, the force that affect the rock bolt, which prevents mechanical assembly of the structure (roof bolt with a measuring device).

The patent DE8535263U1 describes a variation of an anchor bolt which comprises a wedge function in the end of the bolt. The construction in accordance with the patent differs to a significant extent from the construction in accordance with the present application. For example the construction expands only to a limited load, which means that it does not handle high load.

The patent U.S. Pat. No. 3,179,082 describes a variant of a bolt which is intended to be inserted in holes in rock, concrete or the like. Structure comprises an indicator with which the stress acting on the bolt indicated. The construction in accordance with the patent differs to a significant extent from the construction in accordance with the present application. The spring construction allows further that this charging energy which is released by rupture of the rock bolt. The construction is also sensitive to the drill testing of this include bolted joints. The construction of the patent is also not suitable for use on mechanical mounting. The construction can also be sensitive to cracks in the rock when it lacks the present rock bolt dual functions.

The patent U.S. Pat. No. 2,725,843 describes a variant of a rock bolt which is intended to be inserted into holes in the rock and the like. Structure comprises an indicator with which the stress acting on the bolt indicated. The construction in accordance with the patent differs to a significant extent from the construction in accordance with the present application. For example, the construction, according to the patent, lacks of reliability. The design probably needs molded solid to be reliable. Further includes the construction compression springs which can be dangerous in the event of breakage. The structure can also hardly be mounted by a machine.

BRIEF DESCRIPTION OF THE FIGURES

In the following detailed description of the present invention, references and references to the following figures will be made. These figures are briefly described in the following figure list

DETAILED DESCRIPTION OF INVENTION

Figure 1:
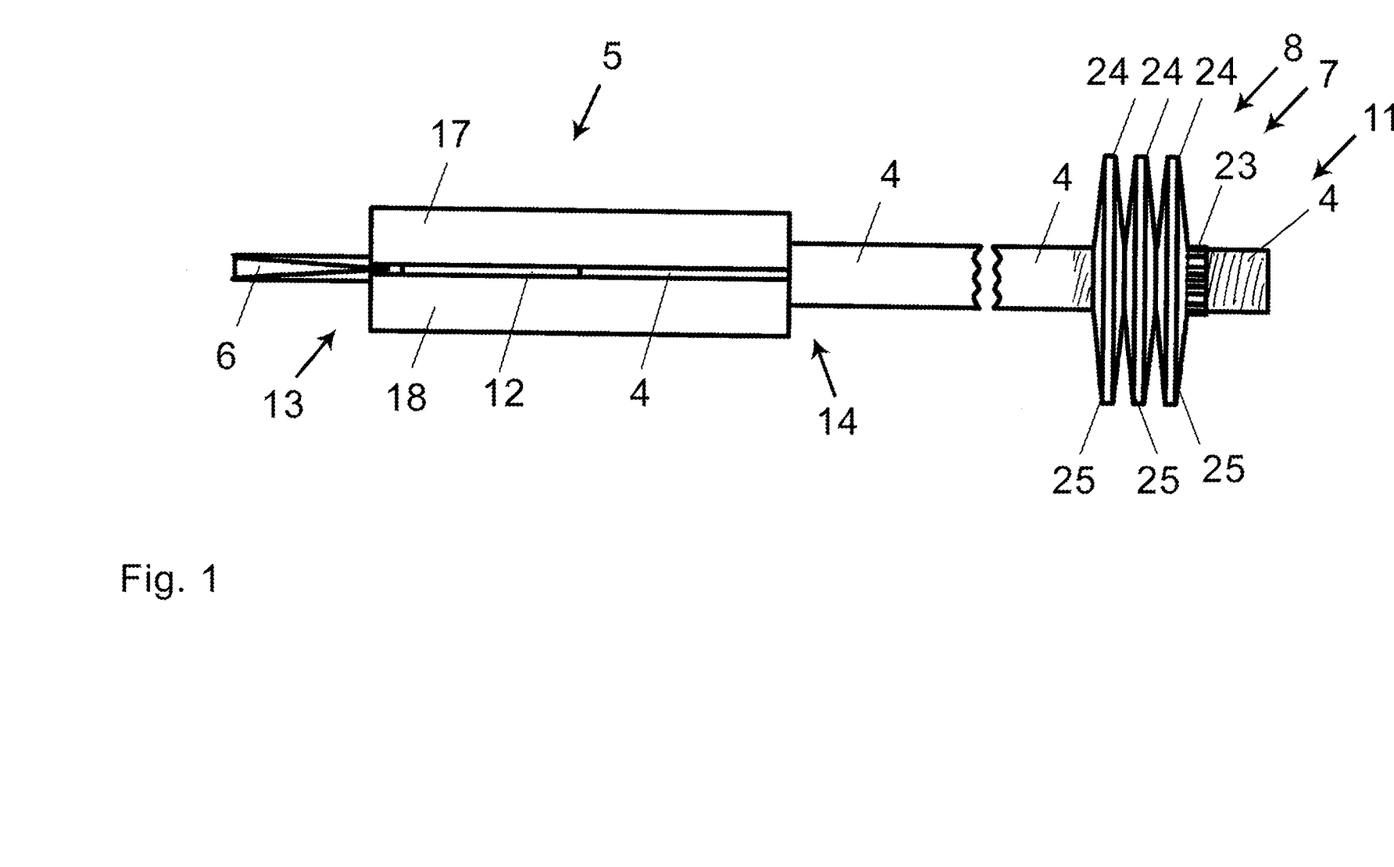
FIG. 1 shows a first embodiment of the present rock bolt.
Figures 2A, 2B:
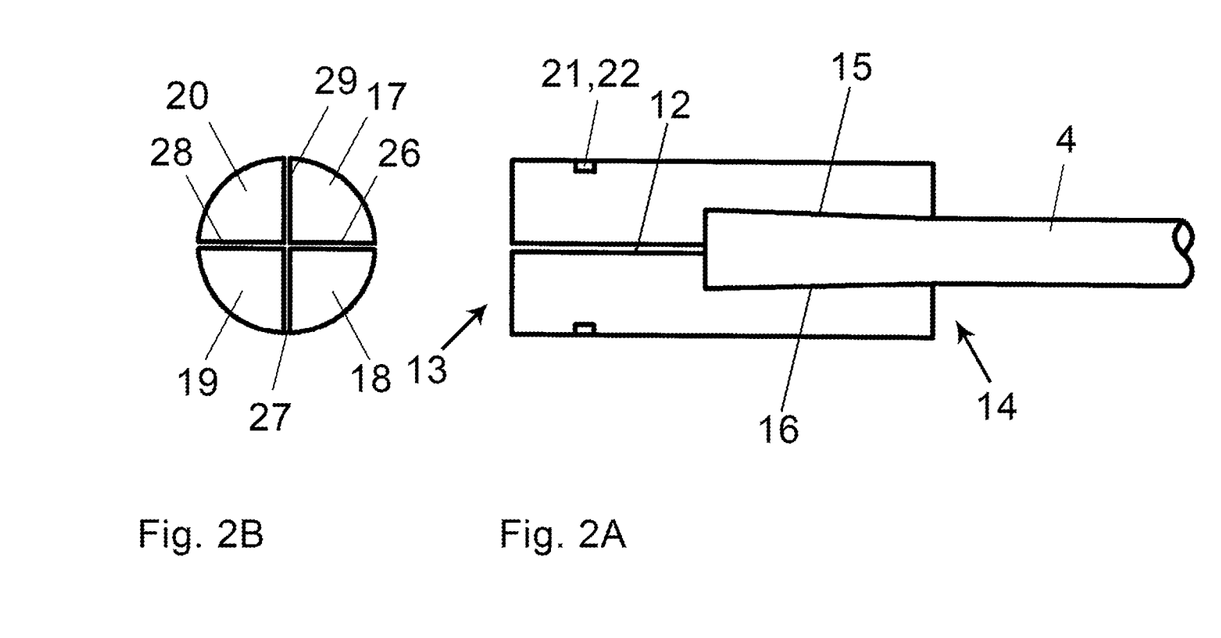
FIG. 2 shows the principle of the rock bolts wedge functions.
Figure 2C:
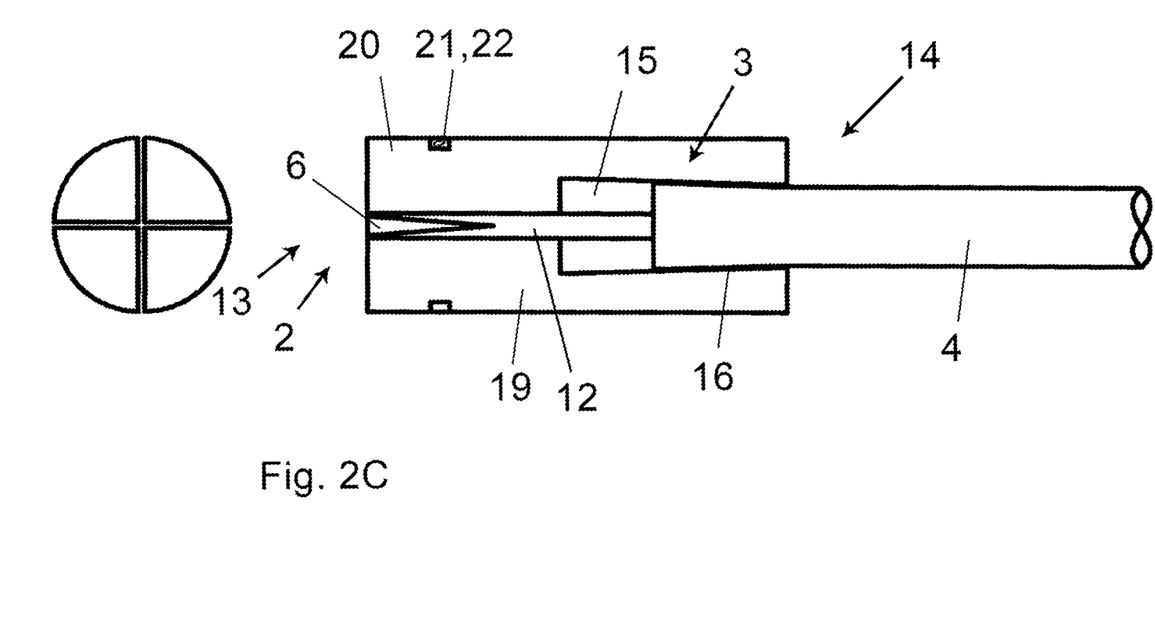
Figure 3A:
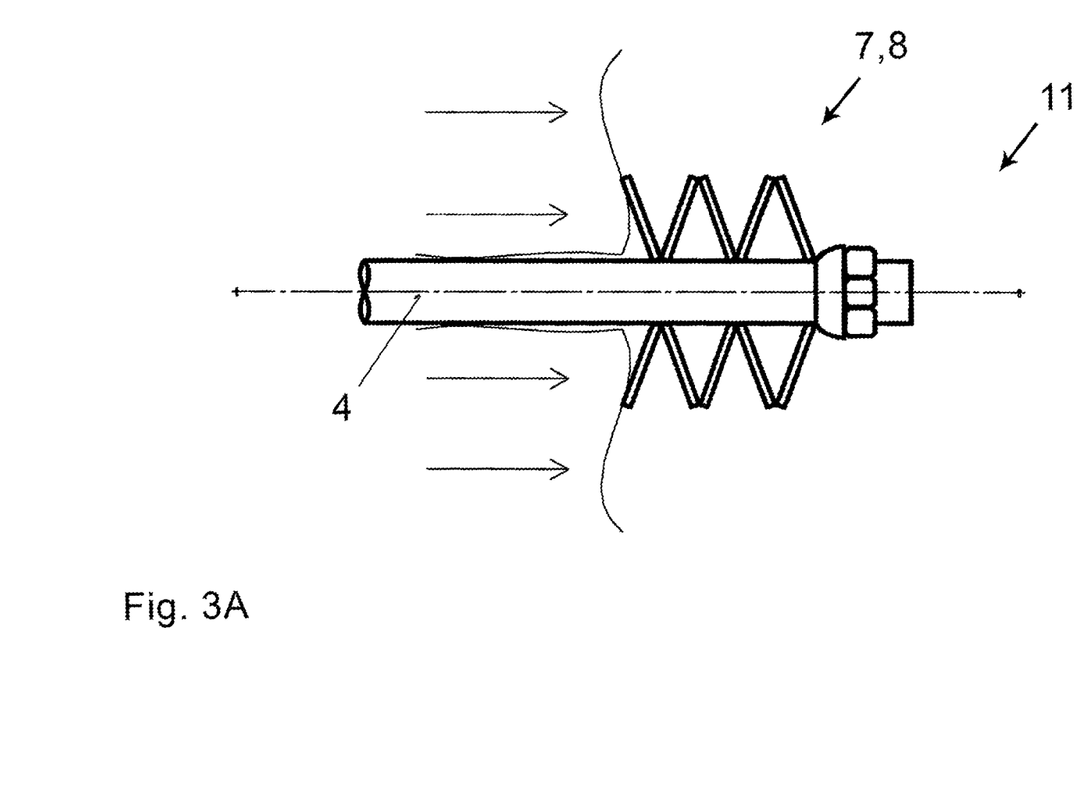
FIG. 3A shows the force indicating function in a less compressed mode.
Figure 3B:
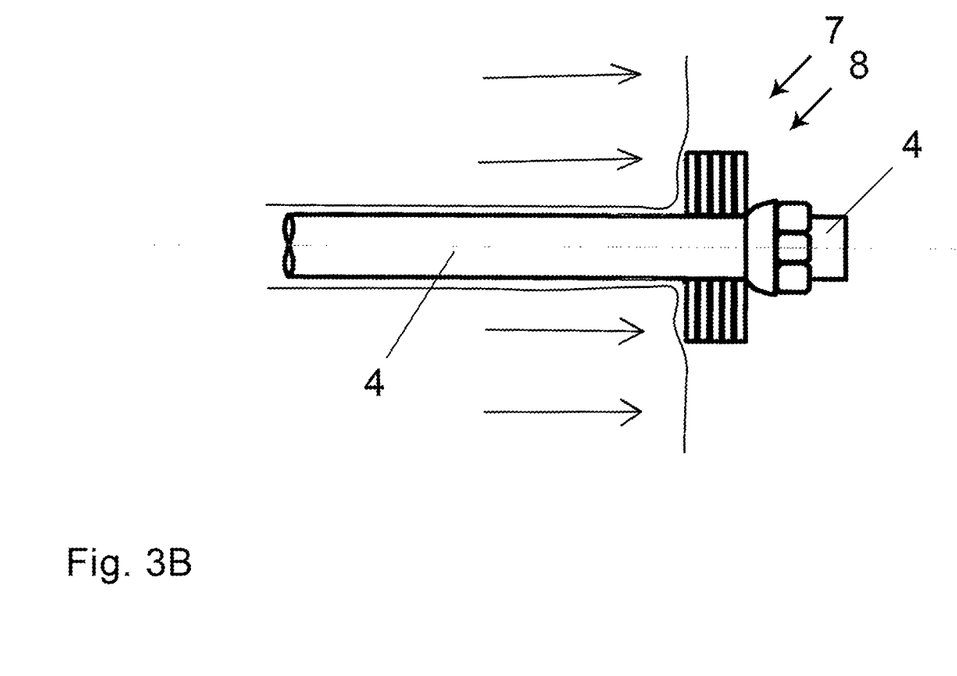
FIG. 3B shows the force-absorbing function in a more compressed mode.

Referring to the figures, a rock bolt 1 in accordance with the present invention is going to be described more in detail. The rock bolt 1 is preferably intended to be used for reinforcement of the roof and walls of underground facilities such as tunnels, resorts and the like. The rock bolt is intended to be inserted in holes drilled in the rock or the like. Preferably, the rock bolt is intended to be inserted in end holes. The rock bolt 1 may also be used in other contexts and applications than those where this is suitable. The rock bolt 1 preferably also includes a function that allows movements in the rock and/or forces affecting the rock bolt can be detected.

Specifically, with the present rock bolt 1 is that this comprises at least a first function for expanding at least a section of the rock bolt in the radial direction and at least a second function for expanding at least a section of the rock bolt in the radial direction. Said functions can be achieved with different techniques. However, in the exemplary embodiment, the first function is achieved by a first wedge device 2. The second function is achieved by a second wedge device 3 (in the figures achieved this wedging action with an internal and an external cone which position is changed relative).

The first function (the wedge device 2) is intended to expand at least a section of the rock bolt length in the radial direction is intended to position and hold onto the rock bolt one to the mountain, with a relatively small force, prior to the second expandable feature brings rock bolt 1 be locked into the rock with a relatively larger force (than the first function).

The above mentioned features are achieved in that the rock bolt 1 comprises at least one elongate rod (lever rod) 4 or the like, at least a first expandable body 5, at least a wedge-shaped body 6 and at least one tightening device 7 preferably also includes a force indication device 8 for indicating force in rock bolt caused by movements in the rock.

The rod 4 is preferably an elongate shape. Rod 4 comprises in its one end 9 at least one section 10 with decreasing cross-sectional area and in its second end 11 at least a tensioning device 7. Section 10 has its larger cross-section at the end of the bar (the portion of the rod which in use is directed towards the bottom of the hole) and the smaller cross-section towards the other end (which in use faces the mouth of the hole). The section of reduced cross sectional area in the preferred embodiment a conical shape and forms a cone (external cone). In the Figures exemplifying the angle of the conical section may vary within the scope of protection of the present patent application. In the Figures exemplifying the angle of the inner cone and outer cone is not limiting the scope. In alternate embodiment the section may have another for the purpose suitable form or forms.

The expandable body 5 preferably comprises at least one hole 12, the lead-through, spaces, or the like, which extends in the expandable body longitudinal direction from one end 13 of the expandable body 5 to the second end 14 of the expandable body 5. The dimension of the hole 12 is adapted in relation to the diameter of the rod 4 and the expandable body 5. At least one section (part) of the hole 12 comprises an internally conical part (internal cone) which has a larger diameter in the one axial direction (the direction which in use is directed towards the bottom of the borehole) and in the other direction has a smaller diameter (which is directed towards the mouth of the hole).

Function to cause the expandable body 5 to expand the expandable body in the radial direction is achieved for example by the construction shown in the Figures. In the figures an internal conical part 15 of the expandable body 5 and an external conical portion 16 of the rod 4. The conical part 15 has a larger diameter at the end of the bar and decreasing the diameter in the second direction against the stent. In alternative embodiments, the internal conical portion (cone) 15 and the outer conical portion (cone) 16 constituted by a unit that has a cross section which has three edges, four edges, five or more edges. In the Figures exemplifying the angle of the conical section may vary within the scope of protection of the present patent application. In the Figures exemplifying the angle of the tapered portions is, therefore, not limiting the scope.

The expandable body 5 is preferably in the transverse direction divided into at least a first part 17 and at least a second part 18. Between the first part and the second part is created by the increase of the expanding diameter of the body at least a first intermediate space 26 and at least a second intermediate space extending from the through hole through the expandable body in the radial direction.

In the preferred embodiment, the expandable body consist of at least a first part (partial section) 17, at least a second part (partial section) 18, at least a third part (partial section) 19 and at least a fourth part (partial section) 20. In the exemplary embodiment, four subdivisions are created at a separate pressing of the expandable parts of the body sections, a first intermediate space 26 between the first part 17 and 18, a second intermediate space 27 between second portion 18 and third portion 19, a third intermediate space 28 between the third 19 and the fourth section 20 and a fourth intermediate space 29 between the fourth section 20 and the first part 17. In the exemplary embodiment, each respective element (17 to 20) the cross sectional shape of a circle segment. Each part (partial section) 17 to 20 comprises a partial section of an internal cone in the through hole.

In the preferred embodiment, the rock bolt is also at least one constraining means 21. The constraining means 21 is intended to hold the expandable body 5 parts assembled with the expandable body 5 when the rock bolt is inserted into the hole. Upon expansion of the expandable body 5 in the radial direction the constraining means 21 the cohesive effect is released. The constraining means may consist of annular member such as an O-ring, spring, or the like. At the mechanical installation of the rock bolt can be the unifying body consist of spot welds, where the parts are stapled together through welding, as the machine's force to drop relative to the mounting. In alternative embodiments, the constraining means 21 comprise another for the purpose suitable union means, or the like.

The expandable body comprises in alternative embodiments, at least one groove 22 that runs around the circumference of the expandable body. In the groove 22 is the constraining means intended to be inserted. The groove 22 has the technical effect that this protects the constraining means, such as O-ring, spring, or the like, so that the risk that the constraining means 21 damaged during insertion in the hole is eliminated or reduced.

The first expandable function is achieved in the exemplary embodiment of the wedging action where the expandable body 5 parts 17-20 are caused to expand by at least one body 6, which comprises at least one wedge-shaped part and preferably also at least a second wedge-shaped part, which (or which) the insertion of the rock bolt in a drilled blind hole is affected by the bottom of the drilled hole to be inserted into the gap between the parts 17-20 of the expandable body. 6, wedge-shaped body part causes the respective intervals between the parts 17 to 20 is expanded and the outer dimension of the expandable body increases (expands) and thereby pressed out towards the drill hole wall whereby the structure is fixed to the wall of the hole. Preferably, the wedge-shaped body is a form of multiple wedges it is, this is a type of body which comprises a wedge-shaped portion causing two of the opposing segments to expand and a second wedge part which causes the second opposing portions to expand. The tensioning device 7 includes at least one first clamping means 23 and at least a second stent member. The stent constituted in the exemplary embodiment of a threaded portion of the rod 4 or the like. In alternative embodiments, the tension device 7 consist of (or comprise) at least one other suitable clamping means 23. In the exemplary embodiment, the second clamping means at least a nut or other component comprising at least one internally threaded hole each second tension member is intended to be threaded onto the threaded portion of the elongated body (4). The tensioning device 7 may also include some form of quick coupling or the like with which the axial movement of the rod relative to the expandable body can be achieved.

In the exemplary embodiment, the expandable body 5 a round cross section. The expandable body 5 external shape may vary within the scope of the invention. For example, the expandable body's 5 cross section be of a polygonal shape, oval shape or other shape suitable for the purpose. In alternative embodiments, the expandable body 5 has another suitable cross section.

The expandable body 5 includes a function with which the expandable body 5 diameter or dimension is increased during a movement of the rod 4 relative to the expandable body 5 in the one direction and in reducing its diameter or dimension during a movement of the rod 4 relative to the expandable body 5 in the second direction.

In an alternative embodiment, the present rock bolt 1 comprises of at least one force indicator, force indicating device or the like. Force indicator, or the force indicator device comprises at least one force-absorbing element and/or a force indicating means 24. The force indicating means may comprise at least one resilient means whose dimensions vary according to the compressive force.

In the exemplary embodiment, the constructions force indicating device comprises of at least one force-receiving element 24 such as at least one plate spring-like means 25.

In the figures, a force-receiving element comprising four or more disc springs. In the illustrated embodiment, the disc springs placed so that every second disk spring is 180 degree turn relative to, or the adjacent, the disc springs. The disc springs are preferably of different types where at least one disc spring is compressed by a predetermined force and at least a second disk spring is compressed by a smaller or larger force than the first spring plate. When connecting the rock bolt 1 to the rock the bolt is partially inserted in a hole in the rock. When the inserted end of the bolt reaches the bottom of the hole, the wedge-shaped body 6 to hit the ground and thus be inserted between the sections 17 to 20 of the expandable body 5 and causing the expandable body 5 to expand in the radial direction, thereby locking (holding) the rock bolt in the rock. After the rock bolts expandable body is caused to expand by the wedge-shaped body 6, and thereby connected to the (press firmly against) the walls of the holes tightened tensioning device whereby the expandable body is expanded in the radial direction of relative movement between the elongated body externally conical section and the in the expandable body internally tapered section. Upon expansion locks the expandable body against the walls of the rock. The torque can be selected by the prevailing conditions and the rock bolt dimensions.

In the detailed description of the present invention, the construction details being omitted as is apparent to one skilled in the field device relates. Such obvious construction details are included to the extent necessary for a proper function to be obtained for the present invention. Although certain preferred embodiments have been shown in detail, variations and modifications of the method and apparatus are apparent to those skilled in the art the invention relates. All such modifications and variations are considered as falling within the scope of the following claims. For example, the construct may include any other type of a tensioning device. The inner cone and the outer cone can in alternative embodiments comprise a device that has three edges, four edges, five or more edges.

Advantages of the Invention

With the present invention, a number of advantages is achieved. An advantage of the present rock bolt is that a fully mechanical rock bolt is obtained. With fully mechanical rock bolt means a rock bolt that does not use encapsulation to anchor rock bolt into the hole. The time required for the molding compound to solidify (for designs where used) is eliminated. Another advantage of the design of the present application is that it makes it easy to use. A further advantage of the construction according to the present patent application is that the limited number of parts makes it cost-effective to manufacture. A further advantage is that the rock bolt handles large dynamic rock movements. Further, the rock bolt, according to the present construction, the advantage that this provides a visual indication of the load on the bolt.

The invention claimed is:

1. A rock bolt intended to be attached within holes in rock, comprising:
    an elongated body having a first end and a second end,
        the first end including a tensioning device movable axially on the first end,
        the second end having a conical portion;
    an expandable body comprising at least first and second separable portions, the at least first and second separable portions defining an internal conical hole within the expandable body,
    wherein the conical portion is located within the internal conical hole such that relative axial movement of the conical portion produces relative separation of the at least first and second separable portions;
    at least one wedge located between the at least first and second separable portions and configured to travel between the at least first and second separable portions to separate the at least first and second separable portions, at least a portion of the at least one wedge extending from the expandable body;
    a connecting member securing the at least first and second separable portions together, the connecting member configured to rupture upon relative outward radial movement of the at least first and second separable portions;
    such that when the expandable body is inserted into a rock hole with the at least one wedge directed into the rock hole, and the at least one wedge impinges on the bottom of the rock hole, the at least one wedge will be forced between the at least first and second separable portions, whereafter operation of the tensioning device moves the elongated body axially relative to the expandable body to further separate the at least first and second separable portions within the rock hole.

2. The rock bolt according to claim 1, further comprising:
at least one force-indicating device for giving visible indication of movement of the elongated body relative to the expandable body when the elongated body is under tension.

3. The rock bolt according to claim 2, wherein:
the at least one force-indicating device comprises multiple different disc springs and each disc spring is compressible by a different predetermined force.

4. The rock bolt according to with claim 1, wherein:
the expandable body further comprises a third separable portion and a fourth separable portion.

5. The rock bolt according to claim 4, wherein:
the wedge comprises includes a first wedge-shaped part and at least one second wedge-shaped part, each wedge-shaped part is configured to be inserted between respective separable portions.

6. The rock bolt according claim 1, wherein:
the elongated body has a threaded portion; and
the tensioning device comprises a tensioning member having internal threads mating and engaging the threaded portion of the elongated body.

7. The rock bolt according to claim 1, wherein:
the connecting member comprises a ring-shaped member.

8. The rock bolt according to claim 7, wherein:
the expandable body has at least one circumferential groove; and
the ring-shaped member is disposed in the at least one circumferential groove.

9. The rock bolt according to claim 8, wherein:
the ring-shaped member is elastic or resilient.

10. The rock bolt according to claim 1, wherein:
the connecting member comprises multiple welds, each joining together respective adjacent separable portions.

* * * * *